(12) United States Patent
Siegl

(10) Patent No.: US 6,324,488 B1
(45) Date of Patent: Nov. 27, 2001

(54) PROCESS AND ARRANGEMENT FOR RECOGNIZING THE ROTATING DIRECTION OF AN INTERNAL-COMBUSTION ENGINE

(75) Inventor: Norbert Siegl, Lenggries (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/135,546

(22) Filed: Aug. 18, 1998

(30) Foreign Application Priority Data

Aug. 18, 1997 (DE) .............................. 197 35 722

(51) Int. Cl.$^7$ .................................... G01M 15/00
(52) U.S. Cl. ................... 702/151; 123/406.18; 73/116
(58) Field of Search ................... 702/151, 145; 73/116; 123/406.11, 406.18, 406.58, 406.61, 406.62, 406.63, 406.64

(56) References Cited

U.S. PATENT DOCUMENTS

| | | |
|---|---|---|
| 4,558,591 | 12/1985 | Francis et al. . |
| 5,079,945 * | 1/1992 | Hansen et al. ............ 73/116 |
| 5,353,635 * | 10/1994 | Saiki et al. ............ 73/117.2 |
| 5,548,995 * | 8/1996 | Clinton et al. ............ 73/116 |
| 5,604,304 * | 2/1997 | Kokubo et al. ............ 73/117.3 |
| 5,621,644 * | 4/1997 | Carson et al. ............ 364/431.04 |
| 5,671,145 * | 9/1997 | Krebs et al. ............ 364/431.04 |
| 5,715,779 * | 2/1998 | Kato et al. ............ 123/90.15 |
| 5,715,780 * | 2/1998 | Haller ............ 123/90.17 |
| 5,924,395 * | 7/1999 | Morya et al. ............ 123/90.15 |
| 5,937,805 * | 8/1999 | Matsumura ............ 123/90.15 |
| 5,987,973 * | 11/1999 | Fuji et al. ............ 73/116 |
| 6,034,525 * | 3/2000 | Koerner et al. ............ 324/165 |
| 6,041,647 * | 3/2000 | Matsuoka ............ 73/116 |

FOREIGN PATENT DOCUMENTS

| | | |
|---|---|---|
| 34 31 232 | 3/1985 | (DE) . |
| 37 33 136 | 4/1989 | (DE) . |
| 42 20 828 | 1/1993 | (DE) . |
| 43 15 637 | 11/1994 | (DE) . |
| 0 144 708 | 6/1985 | (EP) . |
| WP 90/03508 | 4/1990 | (WO) . |

* cited by examiner

Primary Examiner—Patrick Assouad
(74) Attorney, Agent, or Firm—Crowell & Moring LLP

(57) ABSTRACT

In the case of a process for recognizing the rotating direction of an internal-combustion engine using a crankshaft angle sensor, a camshaft angle sensor and an electronic internal-combustion engine control unit which processes the signals of these two sensors, a certain first crankshaft position, which can be sensed by the crankshaft angle sensor and which exists in the case of a reversely rotating internal-combustion engine, is assigned to a certain camshaft position which can be sensed by the camshaft angle sensor. A certain second crankshaft position, which exists in the case of a forward-rotating internal-combustion engine, is assigned to the same camshaft position. These assignments are stored in the internal-combustion engine control unit so that they can be queried to recognize the rotational direction of the engine.

5 Claims, 3 Drawing Sheets

PROCESS AND ARRANGEMENT FOR RECOGNIZING THE ROTATING DIRECTION OF AN INTERNAL-COMBUSTION ENGINE

BACKGROUND AND SUMMARY OF THE INVENTION

This application claims the priority of German Patent Application No. 197 35 722.9, filed Aug. 18, 1997.

The invention relates to a process and an arrangement for recognizing the rotational direction of an internal-combustion engine using a crankshaft angle sensor, a camshaft angle sensor and an electronic internal-combustion engine control unit which processes signals from the two sensors. The crankshaft angle sensor interacts with a generator gear mounted on the crankshaft and has a plurality of teeth. The camshaft angle sensor interacts with a generator gear mounted on the camshaft and has at least one tooth.

Such a process and such an arrangement are known, for example, from German Patent Document DE 34 31 232 C2. In the case of the arrangement known from German Patent Document DE 34 31 232 C2, the crankshaft angle sensor interacts with a generator gear which is mounted on the crankshaft and has the form of a toothed disk having one hundred twenty (120) teeth of the same size, and the camshaft angle sensor interacts with a generator gear which is mounted on the camshaft and has the form of a lug disk having six teeth of different sizes. By means of the arrangement known from German Patent Document DE 34 31 232 C2, the rotating direction of the internal-combustion engine can be recognized solely by the signal of the camshaft angle sensor. The reason for this is that the sequence of the different length pulses, because of the unequal teeth of the lug disk, differs during a rotation in one direction from the sequence during a rotation in the other direction.

If, however, the camshaft generator gear is provided, for example, only with a tooth in the shape of a semicircular lug (so-called half-segment disk, see FIG. 3), then the rotating direction of the internal-combustion engine cannot be recognized by the sequence of the pulses in the signal of the camshaft angle sensor alone. If the internal-combustion engine carries out a reverse rotation, for example as the result of an engine stall or by rolling backward with the forward gear engaged, and yet the internal-combustion engine control unit assumes that there is a forward rotation of the internal-combustion engine, then, particularly, the ignition and the injection are emitted in an incorrect manner. The problems arising in such a case may include an ignition into the suction system, wet spark plugs, unburnt fuel in the catalyst, an incorrect defect diagnosis or an erroneous deceleration recognition.

It is therefore an object of the invention to permit the rotational direction of the internal-combustion engine to be determined independently of the design of the camshaft generator gear.

This object is achieved by a process and apparatus for recognizing the rotational direction of an internal-combustion engine using a crankshaft angle sensor, a camshaft angle sensor and an electronic internal-combustion engine control unit processing signals from the two sensors. The process assigns a certain first crankshaft position, which can be sensed by the crankshaft angle sensor and exists in the case of a reversely rotating internal-combustion engine, to a certain camshaft position which can be sensed by the camshaft angle sensor. A certain second crankshaft position which exists in the case of a forward-rotating internal-combustion engine is assigned to the same camshaft position. These assignments can be stored in the internal-combustion engine control unit such that they may be queried.

The invention is based on recognizing that, as a result of the tensioning device of the chain drive or belt drive for the camshaft, a defined first position of the camshaft generator gear is obtained with respect to the crankshaft generator gear in the event of a reversely rotating internal-combustion engine. When the internal-combustion engine rotates in a forward direction, as the result of the tensioning device, a defined second position of the camshaft generator gear is obtained with respect to the crankshaft generator gear. This second position differs from the first defined position. According to the invention, the first position is defined by the assignment of a certain camshaft position to a certain first crankshaft position which exists when the internal-combustion engine rotates in a reverse manner, and the second position is defined by the assignment of the same camshaft position to a certain second crankshaft position which exists when the internal-combustion engine rotates in a forward manner. The process for recognizing the rotating direction of the internal-combustion engine is carried out particularly through the use of an electronic internal-combustion engine control unit which processes the signals of the crankshaft angle sensor and of the camshaft angle sensor. This processing can be performed by software in the control unit or by a hardwired control circuit, as well as by some combination of hardware and software.

Other objects, advantages and novel features of the present invention will become apparent from the following detailed description of the invention when considered in conjunction with the accompanying drawings.

DETAILED DESCRIPTION OF THE DRAWINGS

Figure 1:
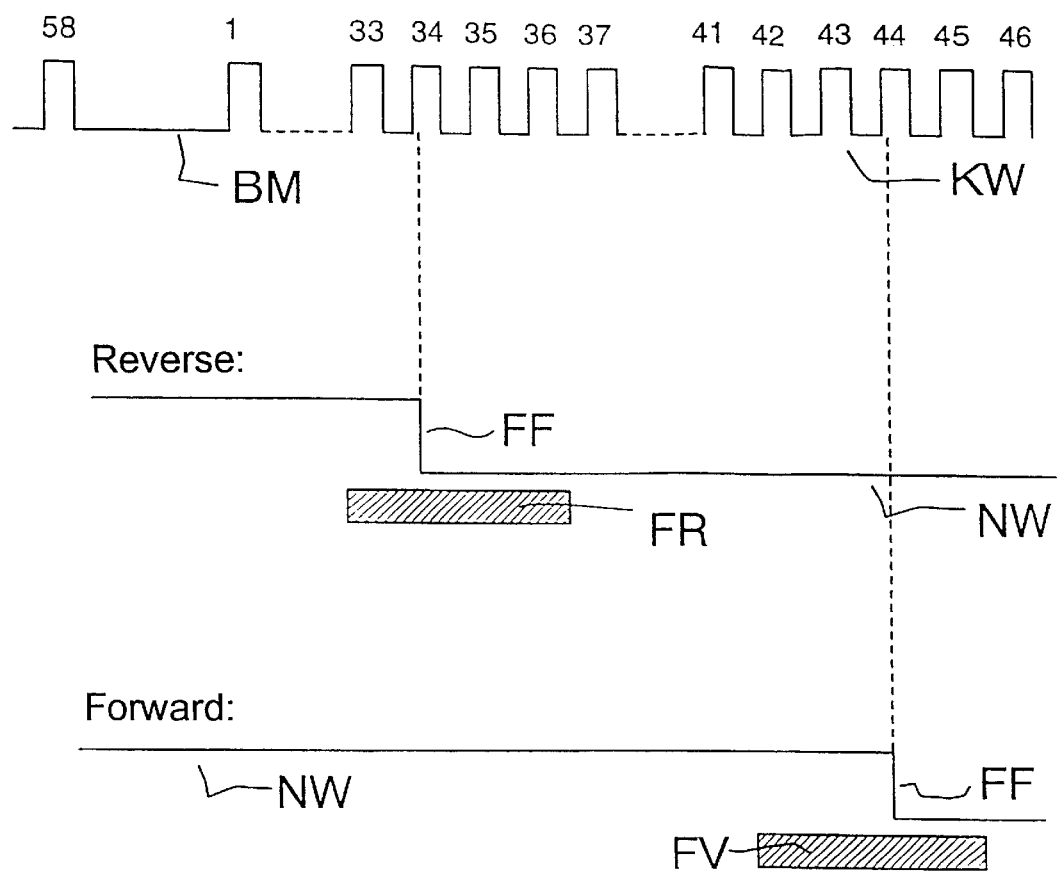
FIG. 1 is a view of the assignment of a certain camshaft position to a certain first crankshaft position in the case of a reversely rotating internal-combustion engine and of the assignment of the same camshaft position to a certain second crankshaft position in the case of a forward-rotating internal-combustion engine.
Figure 3:
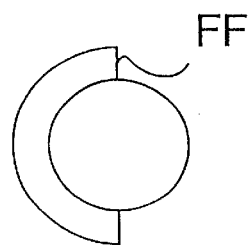
FIG. 3 is a view of a further embodiment of a camshaft generator gear formed as a half-segment disk.

The top of FIG. 1 illustrates the output signal KW of a crankshaft angle sensor for a rotation of the crankshaft generator gear when the engine rotational speed remains constant. In the present case, the crankshaft generator gear has fifty-eight (58) teeth and one relatively large tooth gap in the form of two missing teeth which provides the reference mark BM.

In the center of FIG. 1, the signal NW of the camshaft angle sensor during a reverse rotation of the internal-combustion engine is illustrated. The reverse rotation of the internal-combustion engine is recognized by the fact that the specific camshaft position FF, which is defined by the descending (falling) edge of the signal of the camshaft angle sensor due to the transition of the tooth into the tooth gap at the camshaft generator gear, occurs at tooth 34 or in the tooth area 33 to 36 of the crankshaft angle sensor. This tooth area is defined by the window FR for recognizing a reverse rotation of the internal-combustion engine. The bottom of FIG. 1 illustrates the signal NW of the camshaft angle sensor during the forward rotation of the internal-combustion engine. The forward rotation of the internal-combustion engine is recognized by the fact that the camshaft position FF occurs at tooth 44 or in the tooth area 42 to 45 which is defined by the window FV for the forward rotation recognition.

The different assignment of the camshaft generator gear to the crankshaft generator gear during the reverse rotation and during the forward rotation of the internal-combustion engine is caused by the tensioning device, which is not shown here, of the chain drive or belt drive of the camshaft. This different assignment is utilized in the internal-combustion engine control unit for recognizing the rotating direction of the internal-combustion engine.

Figure 4:
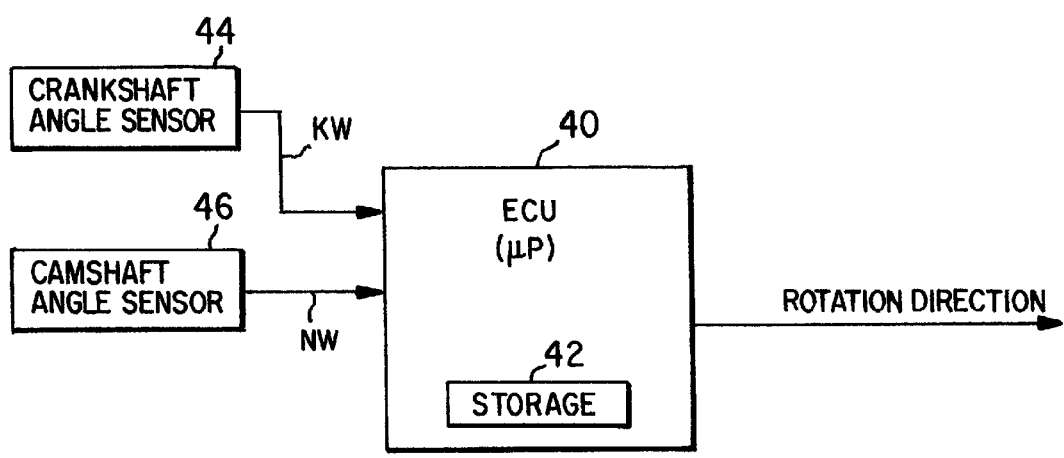
FIG. 4 is a schematic block diagram illustrating the arrangement for carrying out the process according to the present invention.

FIG. 4 is a schematic block diagram illustrating the engine control unit 40 of the internal-combustion engine. The engine control unit 40 can be a microprocessor based control unit including a storage device or memory 42 arranged therein. The engine control unit 40 receives input signals from the crankshaft angle sensor 44 and the camshaft angle sensor 46. As will be discussed below, the engine control unit can be appropriately programmed to process these signals in order to determine a rotational direction output signal indicating the rotation direction of the internal-combustion engine.

Figure 2:
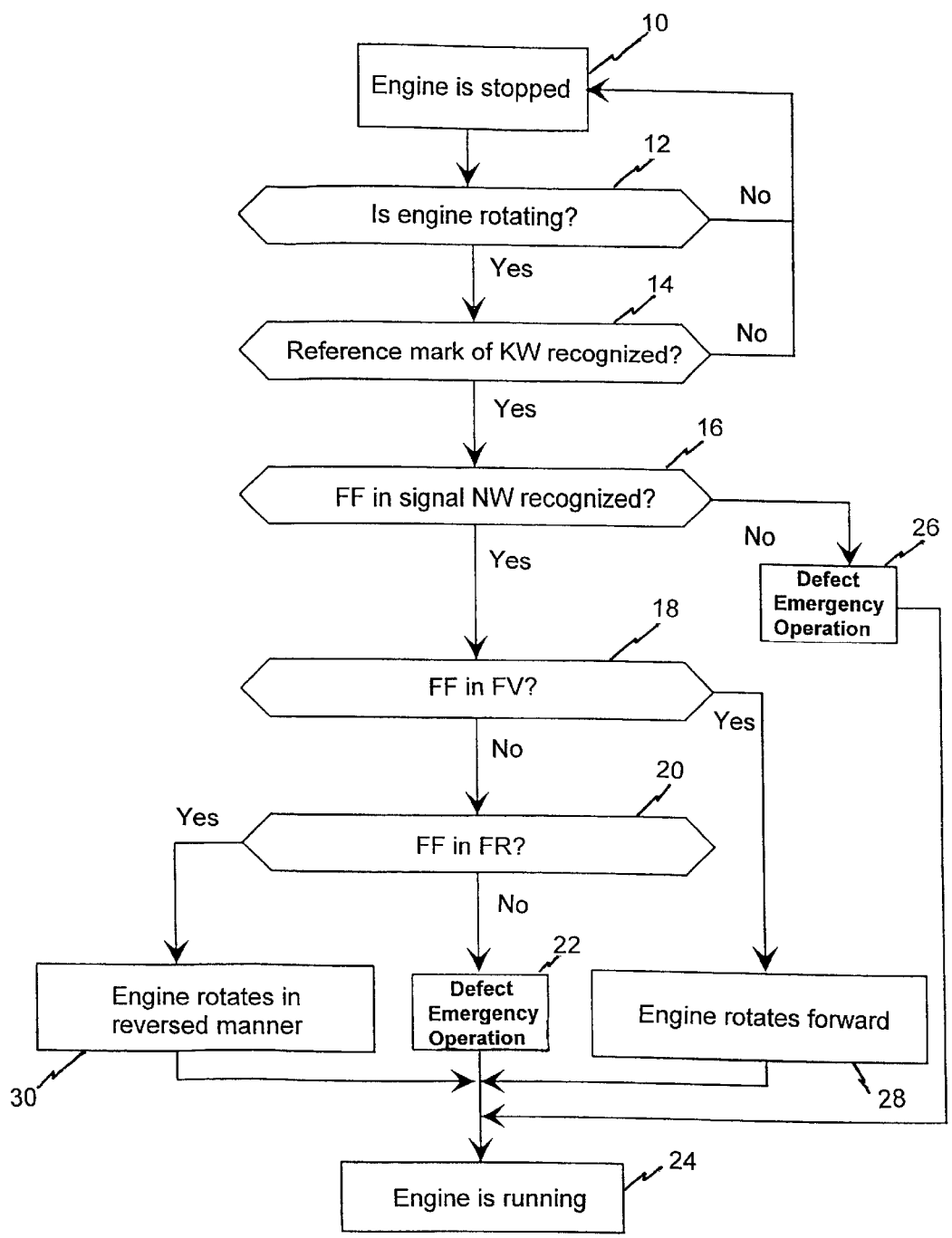
FIG. 2 is an operational flow chart of the program followed in the electronic internal-combustion engine control unit for implementing the process according to the invention.

FIG. 2 shows the process steps which the internal-combustion engine control unit carries out, for example, in order to recognize the rotating direction. The recognition of the rotating direction is required particularly during the start of the internal-combustion engine. Based on a standing internal-combustion engine (step 10), it is determined when the internal-combustion engine starts to rotate (step 12). A rotating of the internal-combustion engine is recognized by the signal KW of the crankshaft angle sensor. In order to detect the crankshaft angle, the next step (step 14) is an awaiting of the reference mark BM in the form of the tooth gap in order to determine the crankshaft angle or the crankshaft position based on the reference mark BM by way of the number of teeth from the reference mark BM. When the descending edge in the signal NW of the camshaft angle sensor is recognized (step 16), it is examined whether this edge FF is situated in the window FV for the forward rotation recognition (step 18) or in the window FR for the reverse rotation recognition (step 20). As a function of the position of the edge FF, a conclusion is drawn concerning the reverse rotation (step 30) or the forward rotation of the internal-combustion engine (step 28). If no edge FF is recognized (steps 16, 20), an emergency operation of the internal-combustion engine is started by means of the internal-combustion engine control unit because a conclusion is drawn in this case that there is a defect (steps 22, 26).

As the result of the process according to the invention, the rotating direction of the internal-combustion engine is recognized in a simple and secure manner by means of components which already exist in the motor vehicle, whereby misfires and faulty fuel injections can be avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for recognizing a rotational direction of an internal-combustion engine using a crankshaft angle sensor, a camshaft angle sensor, and an electronic internal-combustion engine control unit which processes signals from the crankshaft angle sensor and the camshaft angle sensor, the process comprising the acts of:

assigning a defined first crankshaft position to a defined camshaft position, said defined first crankshaft position being sensed by the crankshaft angle sensor and existing when the internal-combustion engine rotates in reverse, and the defined camshaft position being sensed by the camshaft angle sensor;

assigning a defined second crankshaft position to the same defined camshaft position, said second crankshaft position existing when the internal-combustion engine rotates in a forward direction; and querying the assignments stored in an internal-combustion engine control unit to recognize the rotational direction of the internal-combustion engine.

2. An arrangement for carrying out a process for recognizing a rotational direction of an internal-combustion engine, which process assigns a defined first crankshaft position to a defined camshaft position, said defined first crankshaft position existing when the internal-combustion engine rotates in reverse; assigns a defined second crankshaft position to the same defined camshaft position, said second crankshaft position existing when the internal-combustion engine rotates in a forward direction; and queries the assignments to recognize the rotational direction of the internal-combustion engine, the arrangement comprising:

a crankshaft angle sensor interacting with a generator gear mounted on a crankshaft and having a plurality of teeth;

a camshaft angle sensor interacting with a generator gear mounted on a camshaft and having at least one tooth; and an electronic internal-combustion engine control unit having a storage device, said control unit receiving and processing signals from the crankshaft angle sensor and the camshaft angle sensor;

wherein a defined first crankshaft angle portion is assigned to at least one defined signal edge of the signal from the camshaft angle sensor caused by a tooth of the camshaft generator gear, said defined first crankshaft angle portion being determined by a tooth portion of the crankshaft generator gear which exists when the internal-combustion engine rotates in a forward direction; and wherein a defined second crankshaft portion determinable by a further tooth portion which exists when the internal-combustion engine rotates in a reverse direction is assigned to the same defined signal edge of the camshaft angle sensor, wherein the internal-combustion engine control unit queries the assignments stored therein to recognize the rotational direction of the internal-combustion engine.

3. A software product for recognizing a rotational direction of an internal-combustion engine, the product comprising a computer readable medium having stored thereon a program having code segments that:

assign a defined first crankshaft position signal which exists when the internal-combustion engine is rotating in a reverse direction to a defined camshaft position signal;

assign a defined second crankshaft position signal which exists when the internal-combustion engine rotates in a forward direction to said defined camshaft position signal; and queries said assignments to recognize the rotation direction of the internal-combustion engine.

4. A computer program embodied on a computer-readable medium for recognizing a rotational direction of an internal-combustion engine based on crankshaft angle sensor signals and camshaft angle sensor signals, the computer program comprising code segments that:

determine when the internal-combustion engine begins to rotate by detecting a crankshaft angle sensor signal;

determine a crankshaft angle based on a reference mark in the crankshaft angle sensor signal;

detect a defined position of a camshaft angle sensor signal;

determine whether the defined position of the camshaft angle sensor signal corresponds to a position of the crankshaft angle sensor signal indicative of a forward rotation or a rearward rotation of the internal-combustion engine; and recognize the rotational direction of the internal-combustion engine based on the defined position of the camshaft angle sensor signal relative to the crankshaft angle sensor signal.

5. The computer program according to claim 4, further comprising a code segment that recognizes an abnormal operation of the internal-combustion engine when said defined position of the camshaft angle sensor signal is not recognized.

* * * * *